Oct. 12, 1937.　　　　L. E. LA BRIE　　　　2,095,752
BRAKE
Original Filed Nov. 22, 1930　　5 Sheets-Sheet 1

INVENTOR.
LUDGER E. LaBRIE
BY
ATTORNEY

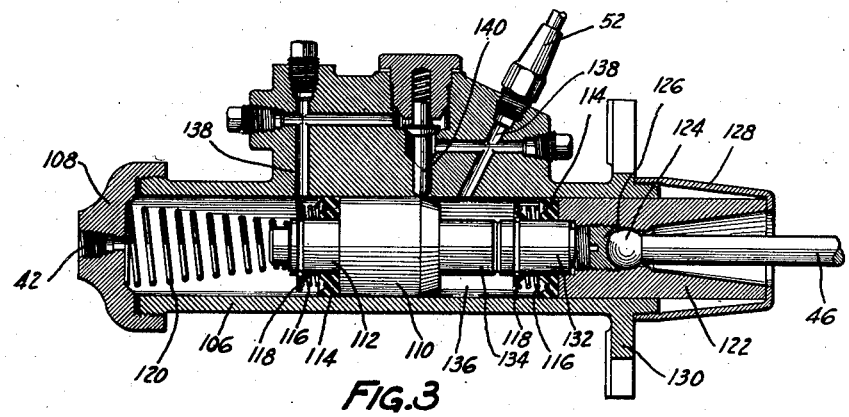
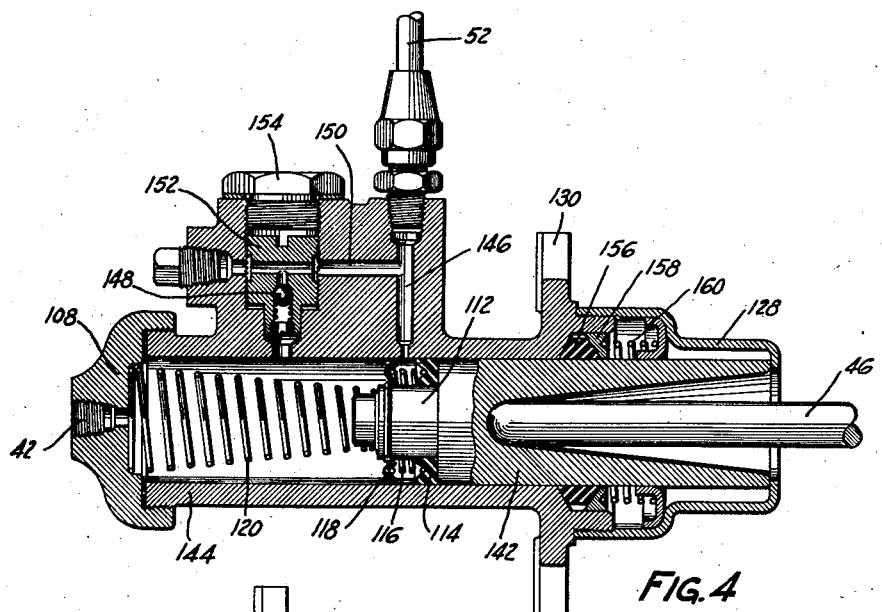
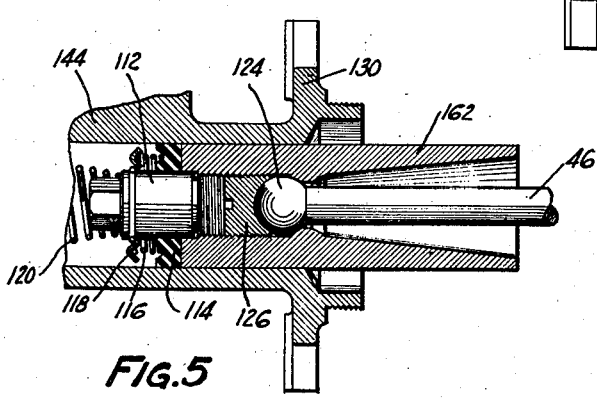
INVENTOR.
LUDGER E. LA BRIE
BY
ATTORNEY

Oct. 12, 1937.  L. E. LA BRIE  2,095,752
BRAKE
Original Filed Nov. 22, 1930  5 Sheets-Sheet 3
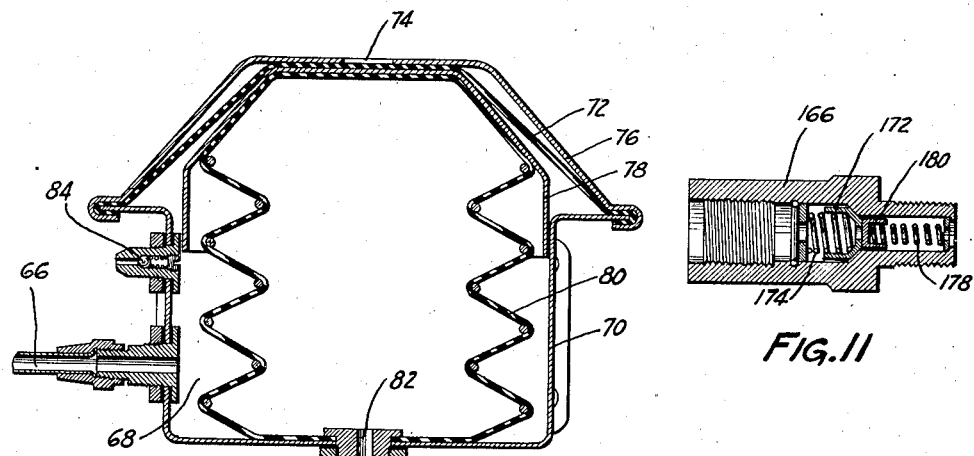
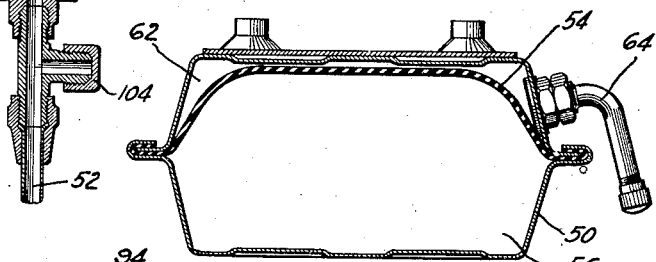
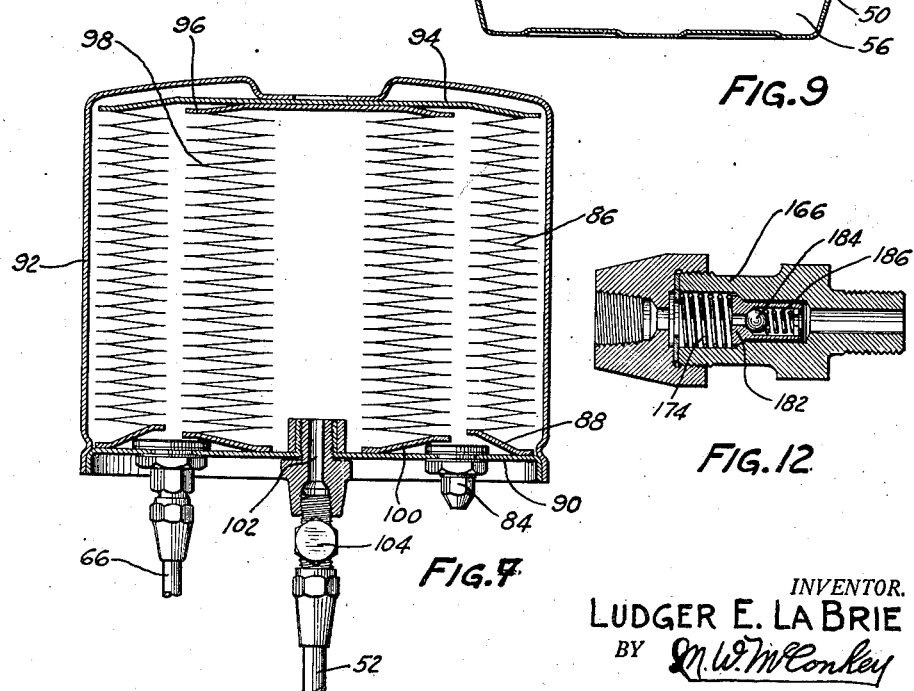
INVENTOR.
LUDGER E. LA BRIE
BY *M.W.M°Conkey*
ATTORNEY Oct. 12, 1937. L. E. LA BRIE 2,095,752
BRAKE
Original Filed Nov. 22, 1930  5 Sheets-Sheet 4
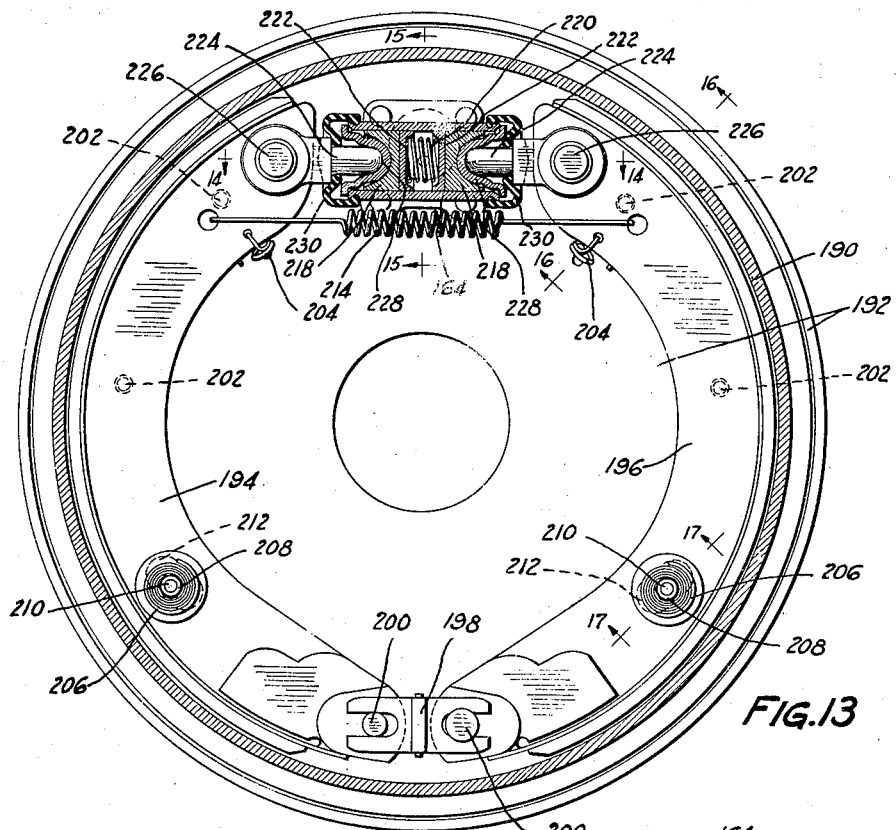
FIG.13
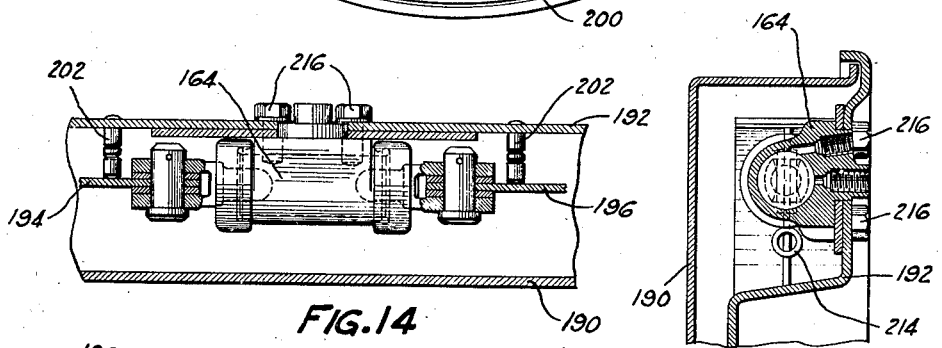
FIG.14
FIG.15
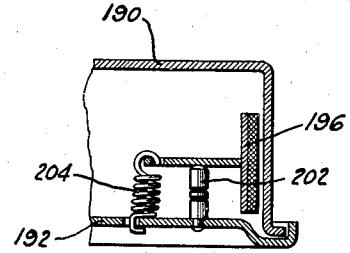
FIG.16  FIG.17
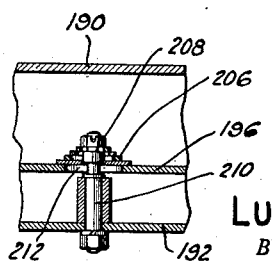
INVENTOR.
LUDGER E. LA BRIE
BY
ATTORNEY Oct. 12, 1937.   L. E. LA BRIE   2,095,752
BRAKE
Original Filed Nov. 22, 1930   5 Sheets-Sheet 5

INVENTOR.
LUDGER E. LA BRIE
BY M. W. McConkey
ATTORNEY

Patented Oct. 12, 1937

2,095,752

UNITED STATES PATENT OFFICE 2,095,752

BRAKE

Ludger E. La Brie, Detroit, Mich., assignor to Bendix Brake Company, South Bend, Ind., a corporation of Illinois Application November 22, 1930, Serial No. 497,383
Renewed October 12, 1936

4 Claims. (Cl. 60—54.6)

This invention relates to brakes, and is illustrated as embodied in a novel system of hydraulic brakes for an automobile.

One feature of the invention relates to applying pressure, preferably through the medium of air or other yielding pressure means, to the reserve supply of liquid in a reservoir connected to the hydraulic system. This not only keeps the system full of liquid and in that way obviates leakage of air into the system, but also keeps the entire system under a pressure which is too light to apply the brakes but which is sufficient to prevent any formation of a vacuum which might suck air into the line.

It will be appreciated that the presence of any substantial amount of air in the lines of a hydraulic brake system renders the system almost inoperative, as all of the brake-applying movement of the parts is then taken up idly in compressing the air. The great advantages of a hydraulic brake system depend to a great extent on the non-compressibility of the operating liquid.

Various desirable and illustrative arrangements are shown for keeping the liquid in the reservoir under pressure, and various features of novelty relate to these particular arrangements. Some of them apply compressed-air as a pressure medium, and others utilize vacuum, for example the suction of the intake-manifold of the engine, to supply the air pressure on the liquid.

Other features of the invention relate to the construction of the master cylinder and of the wheel cylinders, several forms of both being shown. These features have to do with sealing the parts against leakage, to an arrangement for "bleeding" the lines i. e. filling them with liquid and getting rid of entrapped air, and to an arrangement of a two-way check valve in itself embodying substantial novelty, to facilitate the "bleeding".

Another phase of the invention relates to the construction and arrangement of the parts of the brake proper, to permit use of a powerful shiftable-anchorage type of brake, preferably anchoring on the wheel cylinder but without transmitting any of the anchorage torque to or through the brake-applying pistons.

The above and other objects and features of the invention, including various novel and desirable details of construction, will be apparent from the following description of the illustrative embodiments shown in the accompanying drawings, in which:

Figure 3 is a section through the master cylinder assembly of Figure 1;

Figure 4 is a corresponding section through a modified form of master cylinder assembly;

Figure 5 is a section corresponding to the right-hand portion of Figure 4, but showing a different connection between the piston and piston rod;

Figure 6 is a section through the liquid reservoir of the hydraulic system shown in Figures 1 and 2;

Figure 7 is a corresponding section through a different form of liquid reservoir;

Figure 1:
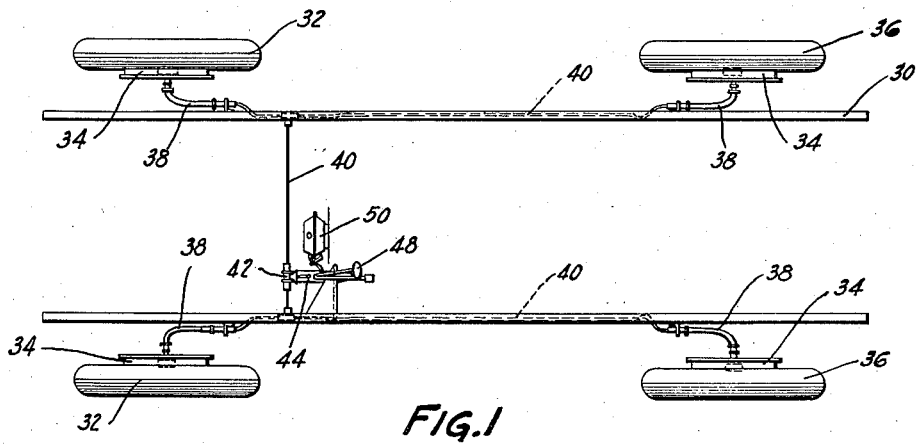
Figure 1 is a top plan view of part of an automobile chassis showing the arrangement of the parts of a system of hydraulic brakes.
Figure 2:
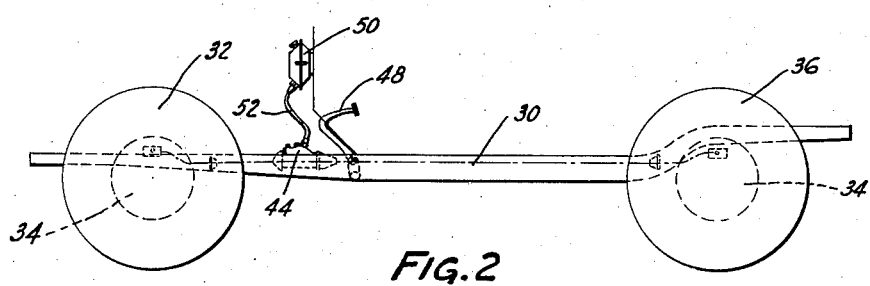
Figure 2 is a side elevation of the chassis shown in Figure 1.
Figures 8, 10:
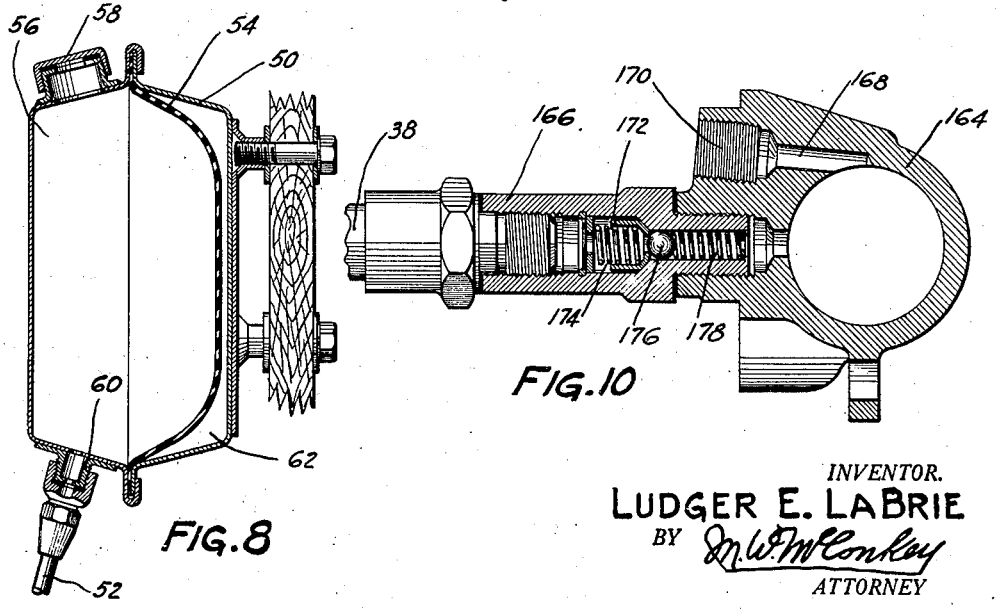
Figure 18:
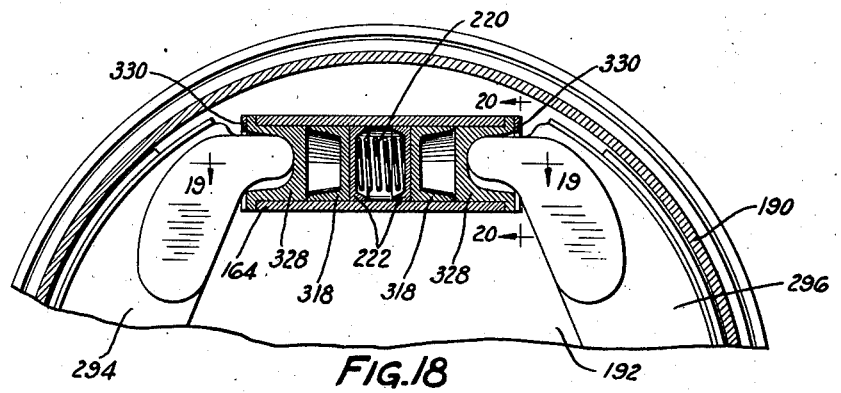
Figure 21:
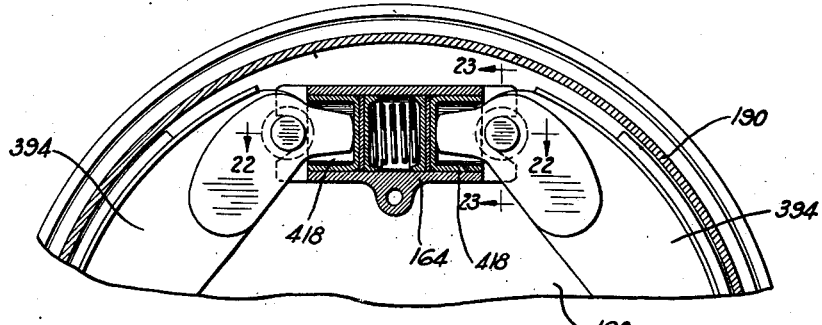
Figures 19, 20, 23:
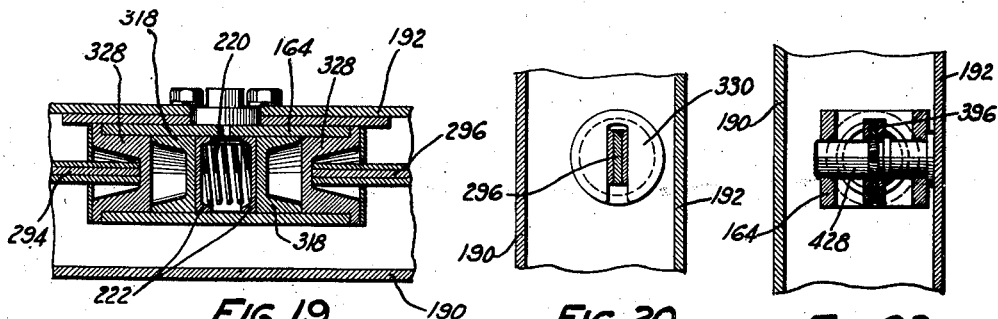
Figure 22:
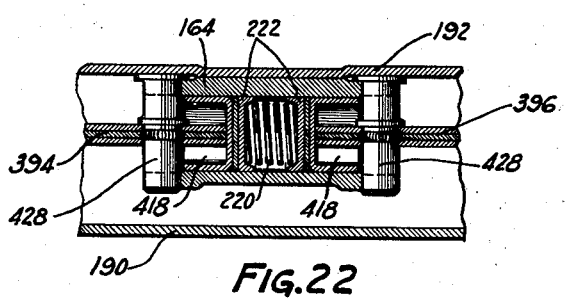

Figures 8 and 9 are sections at right angles to each other through the particular form of liquid reservoir which is illustrated in Figures 1 and 2 and which in some respects is the equivalent of those shown in Figures 6 and 7;

Figure 10 is a section through the cylinder at the brake showing the connection thereto of the hose coupling or the like from the operating lines, and illustrating particularly the arrangement of a two-way check valve used in bleeding the line;

Figures 11 and 12 are sections through fittings containing different types of two-way check valves which may be substituted for the one shown in Figure 10;

Figure 13 is a vertical section through one of the brakes just inside the head of the brake drum and showing the friction means of the brake in side elevation;

Figure 14 is a section on the line 14—14 of Figure 13 and showing the mounting of the end parts of the brake shoes or their equivalents and how these parts engage the applying means;

Figure 15 is a transverse section through the wheel cylinder of Figure 13 on the line 15—15 of Figure 13;

Figure 16 is a section on the line 16—16 of Figure 13 and showing one of the steady rests for the brake shoes;

Figure 17 is a figure on the line 17—17 of Figure 13 and showing another steady rest;

Figure 18 is a partial section corresponding to the upper part of Figure 13 and showing a modified form of applying and anchoring means;

Figure 19 is a section through the modified form of anchoring and applying means on the line 19—19 of Figure 18;

Figure 20 is a partial section on the line 20—20 of Figure 18 and showing the anchoring and applying means in side elevation;

Figure 21 is a partial vertical section corresponding to Figures 13 and 18 and illustrating a third form of anchoring and applying means;

Figure 22 is a section through the third form of anchoring and applying means on the line 22—22 of Figure 21; and Figure 23 is a partial section on the line 23—23 of Figure 21 showing the means for anchoring the brake shoe on the end of the wheel cylinder.

The chassis shown in Figures 1 and 2 includes the usual chassis frame 30 supported by the usual springs on front and rear axles (not shown) carried by front wheels 32 having brakes indicated generally at 34 and on rear wheels 36 having brakes indicated generally at 34. The brakes 34 may be substantially as more fully described below and as illustrated in Figures 13 to 23.

The brakes are intended to be operated by a hydraulic system including flexible hose connections 38 adjacent the four wheels and communicating by suitable pipes 40 carried by the chassis frame 30 with the outlet 42 of a master cylinder assembly 44 which may be of one of the forms shown in Figures 3, 4 or 5 and which contains an operating piston connected by a piston rod 46 with the usual brake pedal 48. The hydraulic system is kept full of liquid by means of a reservoir 50 which may be of one of the forms shown in Figures 6, 7 or 8 and which is mounted on the dash above the master cylinder and on the opposite side of the dash from the driver. The reservoir 50 is connected to the master cylinder 44 by means such as a flexible conduit 52.

The form of reservoir shown in Figures 8 and 9, and which is shown for convenience diagrammatically in Figures 1 and 2 includes a stamped steel container divided vertically into two parts by a flexible diaphragm 54, which may be made of rubberized fabric or other flexible material which will not be affected by the liquid used in the hydraulic system. The part 56 to the left of the diaphragm in Figure 8 contains the reserve supply of liquid, which may be introduced through a filler cap 58 and is formed with an outlet 60 to which the conduit 52 is attached. The part 62 above the diaphragm in Figure 9 is provided with means such as an ordinary tire valve 64 so that it may be filled with compressed air from a tire pump or from the usual air line found in filling stations and garages. It is intended that a pressure of some ten pounds be carried in the space 62, this being just sufficient to insure that the entire hydraulic system is at all times under a pressure sufficient to prevent any sucking in of air and which is yet light enough so that it does not actually apply the brakes.

As shown in Figure 6, instead of the compressed air pressure utilized in Figures 8 and 9, I may provide a connection 66 from the intake manifold of the engine which maintains a partial vacuum in the space 68 in the lower part of a reservoir housing 70 below a diaphragm 72 upon which the atmospheric air may act through an opening 74 in the cover 76. Preferably, the diaphragm 72 acts on the liquid by means such as a cap 78 forming a sort of piston adapted to compress a flexible bag or auxiliary diaphragm device 80 within which the liquid is contained and which communicates through an outlet 82 to the conduit 52. By this arrangement the vacuum of the intake manifold maintains air pressure through the opening 74 on liquid serving as before to keep a pressure of some ten pounds on the light hydraulic system. In order to prevent undue pressure being built up, I may provide an inwardly opening check valve 84 for the space 68 which is held by a spring having such a tension that the valve will open when the pressure in the space 68 drops below the critical predetermined limit.

In the arrangement of Figure 7, the connection 66 from the intake manifold opens into a flexible corrugated metallic diaphragm 86 which is cup-shaped in form and which is secured at its lower mouth to a stamping 88 secured to the cap 90 closing the lower end of an external housing 92. The upper end of the corrugated cup-shaped diaphragm 86 is secured to a base stamping 94 which urges downwardly a corresponding base 96 closing the upper end of a similar corrugated metallic diaphragm 98 which contains a reserve supply of liquid and the mouth of which is closed by a stamping 100 secured to the cap 90. The liquid inside the cup-shaped diaphragm 98 communicates with the conduit 52 through an outlet 102.

Both the containers 80 and 98 may be filled by providing a suitable filler spout 104 with a removable cap.

The master cylinder indicated generally at 44 in Figures 1 and 2 may be of any of the forms shown in Figures 3, 4 or 5. The form shown in Figure 3 includes a cylinder proper 106, which may be made as a casting, and one end of which is permanently closed by a cap 108 containing the outlet 42 to the conduit 40. Inside of the cylinder 106 is arranged a floating piston 110 having a cylindrical extension 112 upon which is sleeved a sealing member such as a rubber gasket 114 slidably engaging the inner face of the cylinder 106. The sealing member 114 is held in place against the face of the piston 110 by means such as a spring 116 confined between the sealing member 112 and a washer or equivalent stop 118 on the forward end of the extension 112. The piston 110 is urged in a direction to release the brakes by means such as a light spring 120 confined between the cap 108 and the stop at the end of the extension 112.

The floating piston 110 is forced to the left to apply the brake by means such as a secondary or operating piston 122 formed with a central axial opening through which the piston rod 46 passes and which is formed with a spherical seat receiving a spherical head 124 on the end of the piston rod. The spherical head 124 is embraced between the seat formed on the piston and the semi-spherical concave bottom of a plug 126 threaded into the opening in the piston, thus forming a ball-and-socket joint. The idle or released position of the auxiliary piston 122 is determined by engagement of its base with a cup-shaped stamping 128 threaded on the end of the cylinder 106 just beyond a flange 130 which is adapted to engage and be bolted to a part of the chassis frame of the car.

The auxiliary piston 122 is formed with an extension 132 disconnectedly engaging a projection 134 on the rear end of the piston 110 so that the piston 122 forces the floating piston 110 to the left to apply the brakes, but does not compel the floating piston to return to its idle position when the brakes are released. The space 136 between the two pistons is in communication by a passage 138 with the conduit 52 from the liquid reservoir so that any suction created by a quick return of the operating piston is compensated for by the introduction into the chamber 136 of compensating liquid from the reservoir. In this connection I prefer that most of the force for returning the piston 110 should come from the brakes rather than from the spring 120 which is provided mainly to insure that when the brakes are fully released, the floating piston 110 will finally move far enough to the right in Figure 3 to clear a port 138 communicating with the conduit 52 through a passage controlled by a spring-pressed poppet valve 140 which is pushed upwardly by the conical return end of piston 110 when the brake is fully released. The upward movement of the valve 140 establishes communication between the liquid in the reservoir and the space in the cylinder 106 in front of the floating piston 110 and thereby communicates the pressure in the liquid reservoir to the entire hydraulic system. As soon as the brake is applied, however, the piston 110 cuts off the port 138 and at the same time allows the valve 140 to seat itself to cut off back pressure from the hydraulic system to the liquid reservoir and chamber 136. This, however, does not interfere with the free communication between the liquid reservoir and the space between the pistons 110 and 122, which space therefore serves at all times as a liquid seal effectively preventing any building up of suction anywhere in the assembly which might cause the introduction of air.

In the arrangement of Figure 4, the piston rod 46 disconnectedly engages a piston 142 in a cylinder 144 which is generally similar to the pistons described above except that there is only one piston and except that when this piston closes off a port 146 communicating with the liquid reservoir, during the first part of the brake applying movement of the pedal, the return of any liquid from the space in front of the liquid to the reservoir is prevented by a spring-pressed ball check valve 148 some distance in advance of the piston and which controls a passage 150 partly formed in the cylinder casting and partly formed in a plug 152 threaded into an opening in the casting and containing the check valve. A double seal at this point is provided by threading into the casting above the plug 152 a cap 154. The passage 150 communicates with the conduit 52 and therefore when the brake is being released if any vacuum tends to build up at any point in the system, the pressure in the liquid reservoir, together with the vacuum so created, will open the check valve 148 and cause the system to fill with liquid from the reservoir, thereby effectively preventing the building up of suction sufficiently to introduce air into the system.

The rear end of the piston 142 is shown as sealed by a gasket or the like 156 held against the conical wedge-shaped seat on the end of the cylinder by a conical wedge ring 158 held by a spring 160. The wedge surfaces confining gasket 156 squeeze it inwardly into liquid tight engagement with the skirt of the piston 142.

The arrangement in Figure 5 is substantially the same as that in Figure 4 except that the piston rod 46 is connected to the piston 162, corresponding to the piston 142, between the ball-and-socket joint of Figure 3. In this arrangement, the positive return of the piston has some tendency to cause a suction in the cylinders which, however, immediately permits the valve 148 to open, whereupon liquid enters from the reservoir and again breaks the suction. If the piston 162 reaches its completely released position before the brakes at the wheels are completely released, the latter will continue to force liquid backwardly into the cylinder, whereupon enough liquid is forced up through passage 146 to compensate for excess liquid which has entered past the valve 148.

A connection between the master cylinder and each of the wheel cylinders 164 preferably includes, immediately adjacent the wheel cylinder, a fitting 166 within which is arranged a two-way check valve which is utilized to control "bleeding" through a passage 168 which is normally closed by a plug threaded into an outlet opening 170. In the arrangement of Figure 10, fitting 166 is formed internally with a double diameter bore. Inside of the larger diameter portion of the bore is a cup-shaped piston valve 172 urged by a spring 174 against a conical seat at the junction of the small and large diameter parts of the bore. The valve member 172 is formed with an opening base communicating with the small diameter part of the bore and which is normally closed by a ball check valve 176 urged there-against by a spring 178. When it is desired to "bleed" the system to fill it with liquid or to remove air which has become entrapped therein, the plug is removed from the outlet opening 170 and sufficient liquid is forced from the master cylinder and the reservoir through the various conduits 38 and 40 to fill all the wheel cylinders 164 and pump an excess through the four outlets 170 sufficient to insure the removal of all the air. When this is being done, the ball check valve 176 yields to permit the passage of the additional liquid. During the application of the brake, when pressure is applied to the system, liquid passes the ball check valve 176 through opening in the base of the cup-shaped valve member 176 in sufficient quantity to force the brake shoes against the drum. When the brake is released, the return springs force this additional liquid backwardly, whereupon the cup-shaped valve member 172 moves back off its conical seat and permits the additional liquid to leak back around between the valve member and the large diameter part of the bore of the fitting 166.

In Figures 11 and 12 are shown two other forms of two-way check valves which may be provided in the fitting 166. In the arrangement of Figure 11, the cup-shaped valve member 172 is arranged as in Figure 10, but in place of the ball check valve 176, I provide another piston valve member 180 held between spring 178 in a position to close the opening in the bottom of the valve member 172. In the arrangement of Figure 12, a hollow valve member 182 is held against the above-described conical seat between spring 174, a ball check valve 184 being arranged inside of the valve member 182 and held in place lightly by a spring 186.

The brake shown in Figures 13 to 17 include a rotatable drum 190, at the open side of which is arranged a suitable support such as a backing plate 192 and within which is arranged the friction means of the brake. I prefer to utilize a brake of the shiftable-anchorage type, which may embody floating friction means shown as including a pair of shoes 194 and 196 connected by a suitable adjustment such as an expansible joint 198 of any desired form connected to the lower ends of the shoes by pivots 200. The shoes may be positioned by means such as steady rest pins 202 carried by the backing plate and engaging the webs of the shoes and against which the webs of the shoes are urged by means such as springs 204 tensioned between the shoe webs and backing plate and conical springs 206 confined between the shoe webs and nuts or other stops 208 on the ends of steady rest pins 210 carried by the backing plate and passing through relatively large openings 212 in the shoe webs.

The particular brake shown in Figure 13 is applied, against the resistance of a return spring 214 tensioned between the shoes, by novel means which includes the above-described wheel cylinder 164 which is attached to the backing plate by means such as screws 216, as shown in Figures 14 and 15.

Within the cylinder 164 are a pair of floating opposed pistons 218, against the heads of which a spring 220 holds a pair of rubber sealing cups 222. The floating pistons act to apply the brake in such a manner that one or the other of the shoes may anchor by engagement of one of the thrust members 224 connected to the ends of the shoes by pivots 226. The pivoted thrust members 226 engage anchor cups 228 which are arranged to transmit the brake applying force from the floating pistons 218 to the thrust members 224 and the bases of which also anchor against the ends of the cylinder so that the braking torque is taken from one or the other of the thrust members 224 against cylinder 164 without acting on the pistons 218. Suitable boots 230 of rubber or the like may, if desired, be provided to close the ends of the cylinder 164 and house in the above-described anchoring and applying parts.

In the arrangement of Figures 18 to 20, the shoes 294 and 296 are arranged with reinforced rounded projections at their ends for direct engagement with two anchoring parts in the form of auxiliary pistons 328 engaged by the skirts of the floating pistons 318 corresponding to the above-described pistons 218 and the brake of Figure 13. Caps 330 may be mounted over the ends of the pistons, if desired, to house in as much as possible of the operating parts. In this arrangement, one or the other of the shoes 294 or 296 anchors through the medium of one of the auxiliary pistons 328 against one or the other of the ends of the cylinder 164.

In the arrangement of Figures 21 to 23, the shoes 394 and 396 are formed with reinforced rounded projections at their ends in direct engagement with the floating operating pistons 418. The torque of the brake in this case is transmitted to the ends of the cylinder 164 by means such as transverse anchor pins 428 seated in the ends of the shoes and preferably mounted there permanently by having narrow center portions which are forced into the webs of the shoes as far as permitted by flanges on the ends which engage the sides of the webs. The transverse anchor pins 428 seat in correspondingly shaped notches in flanges integrally formed in the ends of the cylinder 164.

In all three of these embodiments, the brake is arranged to anchor at one end when the vehicle is moving forward and at the other end when the vehicle is moving backward so that the entire friction device consisting of the two adjustably and pivotally connected shoes or their equivalents will be effective no matter which way the vehicle is moving and no matter which way the brake drums are turning.

The structure of the wheel brake cylinder and the combination thereof with the check valve is also shown and is described in my copending application Serial No. 92,798. The structure of the check valve is also shown and described and is claimed in my copending application Serial No. 93,325. The structure of the piston rod coupling is also shown and described and is claimed in my copending application Serial No. 92,062. The wheel brake structure is also shown and described and is claimed in my copending application Serial No. 93,447, and the reservoir is also shown and described and is claimed in my copending application Serial No. 77,733.

While a number of illustrative embodiments of the invention have been described in detail, it is not my intention to limit its scope to these particular embodiments or otherwise than by the terms of the appended claims.

I claim:

1. For use in a hydraulic brake system, a master cylinder piston arranged to move forward in applying the brakes; a master cylinder comprising a casting formed with a main bore and with a forward intersecting smaller bore and a rearward intersecting smaller bore, the smaller bores forming ports for said main bore, the forward smaller bore having a threaded portion, the port formed by the rearward smaller bore being arranged immediately in advance of the normal retracted position of the master cylinder piston and allowing flow of liquid in either direction when said master cylinder piston is in its retracted position and the port formed by the forward smaller bore being arranged substantially in advance of the first mentioned port, said casting being also formed with a third bore connecting said two first mentioned smaller bores; a reservoir; a threaded plug formed with a central bore and inserted in said threaded bore and closing the opening thereof to the atmosphere; and a valve in said plug bore comprising a movable element and a spring urging said element toward its seat, said valve being arranged to allow substantially free passage of fluid from said reservoir through said forward port to the master cylinder but to prevent passage of fluid through said port from the master cylinder to the reservoir.

2. In a hydraulic brake apparatus, a master cylinder formed with a pressure chamber and with a recess, a plug in said recess having a circular groove formed around it and having a central bore, a reservoir connected to said circular groove, an inlet port connected to said plug bore and leading from the center of said recess to said chamber and another inlet port leading to said chamber and connected to said circular groove, a piston in said pressure chamber, and a valve in said plug bore for controlling the first named of said ports.

3. In a hydraulic brake apparatus, a master cylinder formed with a pressure chamber, with a recess formed in one of the outer faces thereof, and with a pair of inlet ports leading from said recess to said chamber; a piston in said pressure chamber normally positioned rearwardly of both of said inlet ports; a valve for controlling one of said ports, said valve comprising a plug secured in said recess and formed with a longitudinal passageway communicating at one end with one of said inlet ports and having a shoulder, a valve element in said passageway adapted to seat on said shoulder, and a spring bearing on said element, said plug being also formed with a transverse passageway communicating with said longitudinal passageway and with said other port; a reservoir; and a connection from said reservoir to the end of said longitudinal passageway opposite to its connection with said inlet port.

4. In a hydraulic brake apparatus, a master cylinder formed with a forward inlet port and with a rearward inlet port, with a pressure chamber, and with a recess; a plug in said recess having a circular groove around it communicating with said rearward inlet port, having a longitudinal passageway communicating at its inner end with said forward inlet port, and having a transverse passageway connecting said longitudinal passageway with the groove; a piston in said pressure chamber normally positioned rearwardly of said rearward port and being arranged to be moved forwardly over said port; a reservoir; a connection from said reservoir to the outer end of said longitudinal passageway; and a valve in said longitudinal passageway for controlling the movement of said fluid between said forward port and said longitudinal passageway.

LUDGER E. LA BRIE.